(12) United States Patent
Ko

(10) Patent No.: US 7,933,698 B2
(45) Date of Patent: Apr. 26, 2011

(54) SYSTEM MAINTAINING TEMPERATURE OF DECK

(75) Inventor: Jae Gyun Ko, Seoul (KR)

(73) Assignee: Hyundai Motor Company, Seoul (KR)

( * ) Notice: Subject to any disclaimer, the term of this patent is extended or adjusted under 35 U.S.C. 154(b) by 1001 days.

(21) Appl. No.: 11/807,858

(22) Filed: May 29, 2007

(65) Prior Publication Data

US 2008/0147269 A1    Jun. 19, 2008

(30) Foreign Application Priority Data

Dec. 13, 2006   (KR) .................. 10-2006-0126877

(51) Int. Cl.
*G06F 7/00* (2006.01)

(52) U.S. Cl. ......... 701/36; 62/259.2; 454/69; 165/80.3

(58) Field of Classification Search ............ 701/36; 62/259.2, 244; 454/69, 143, 121, 148; 361/688; 165/80.3

See application file for complete search history.

(56) References Cited

U.S. PATENT DOCUMENTS

| | | | | |
|---|---|---|---|---|
| 4,333,606 A | * | 6/1982 | Shimada et al. | 237/12.3 A |
| 4,365,525 A | * | 12/1982 | Imazaike | 475/337 |
| 4,792,766 A | * | 12/1988 | Wieschhoff et al. | 330/298 |
| 4,930,455 A | * | 6/1990 | Creed et al. | 123/41.1 |
| 5,253,484 A | * | 10/1993 | Corman et al. | 62/239 |
| 5,481,885 A | * | 1/1996 | Xavier et al. | 62/259.2 |
| 6,214,409 B1 | * | 4/2001 | Mitani et al. | 427/68 |
| 6,296,562 B1 | * | 10/2001 | Uemura et al. | 454/121 |
| 6,409,590 B1 | * | 6/2002 | Suzuki et al. | 454/143 |
| 6,702,008 B1 | * | 3/2004 | Hibino et al. | 165/202 |
| 7,082,772 B2 | * | 8/2006 | Welch | 62/3.2 |
| 7,100,675 B2 | * | 9/2006 | Yamamoto et al. | 165/42 |
| 7,159,651 B2 | * | 1/2007 | Ito et al. | 165/202 |
| 2004/0074248 A1 | | 4/2004 | Tanaka et al. | |
| 2005/0039465 A1 | * | 2/2005 | Welch | 62/3.7 |
| 2005/0056401 A1 | * | 3/2005 | Saito et al. | 165/80.3 |
| 2006/0219399 A1 | * | 10/2006 | Yamamoto et al. | 165/202 |

(Continued)

FOREIGN PATENT DOCUMENTS

JP        58-096934       6/1983

(Continued)

*Primary Examiner* — Khoi Tran
*Assistant Examiner* — Jaime Figueroa
(74) *Attorney, Agent, or Firm* — Edwards Angell Palmer & Dodge LLP; Kongsik Kim, Esq.

(57) ABSTRACT

A system for maintaining the temperature of a vehicle audio and/or audio-video deck provided in a vehicle cabin is provided, comprising: an air duct positioned on both sides of the deck for supplying cooled or heated air to the vehicle cabin, a side part of the air duct defining therein a plurality of through holes through which cooled or heated air can be supplied to the deck; a sensor disposed inside the deck for detecting the temperature inside the deck; a side panel provided in the deck, which defines therein a penetration part for introducing cooled or heated air supplied through the through holes into the deck; a guide rail formed to the side panel; a sliding panel guided by the guide rail so as to open or close the penetration part; a driving motor coupled to the deck for moving the sliding panel along the guild rail; and a controller coupled to the deck for driving the driving motor in response to the temperature detected by the sensor so as to open or close the sliding panel, thereby maintaining the temperature of the deck at a target temperature or range.

6 Claims, 4 Drawing Sheets

U.S. PATENT DOCUMENTS

2007/0140312 A1* 6/2007 Seo et al. .................. 374/145

FOREIGN PATENT DOCUMENTS

| | | |
|---|---|---|
| JP | 63-155488 | 6/1988 |
| JP | 08-295120 | 11/1996 |
| KP | 10-1997-0019801 | 4/1997 |
| KP | 10-2006-0065269 | 6/2006 |
| KP | 10-2005-0123290 | 12/2009 |

* cited by examiner

【FIG. 1】 (Prior Art)
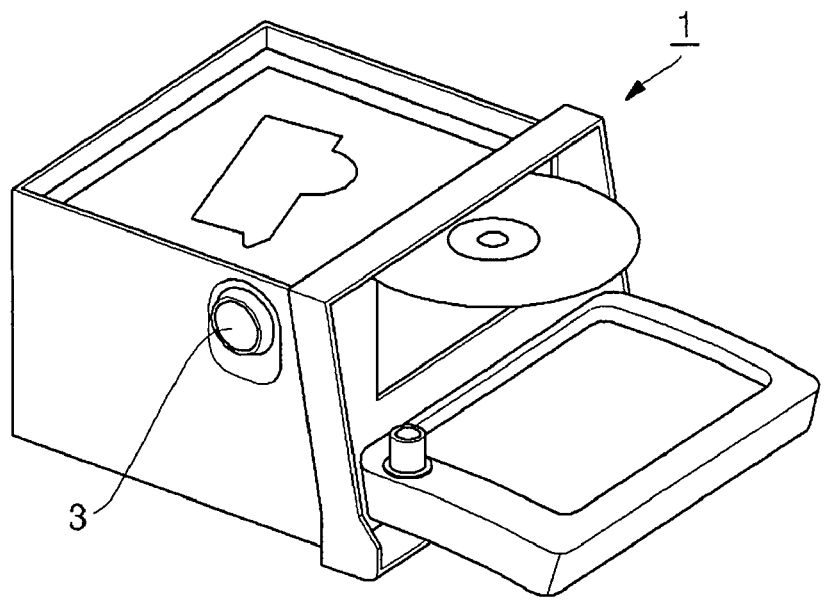
【FIG. 2】
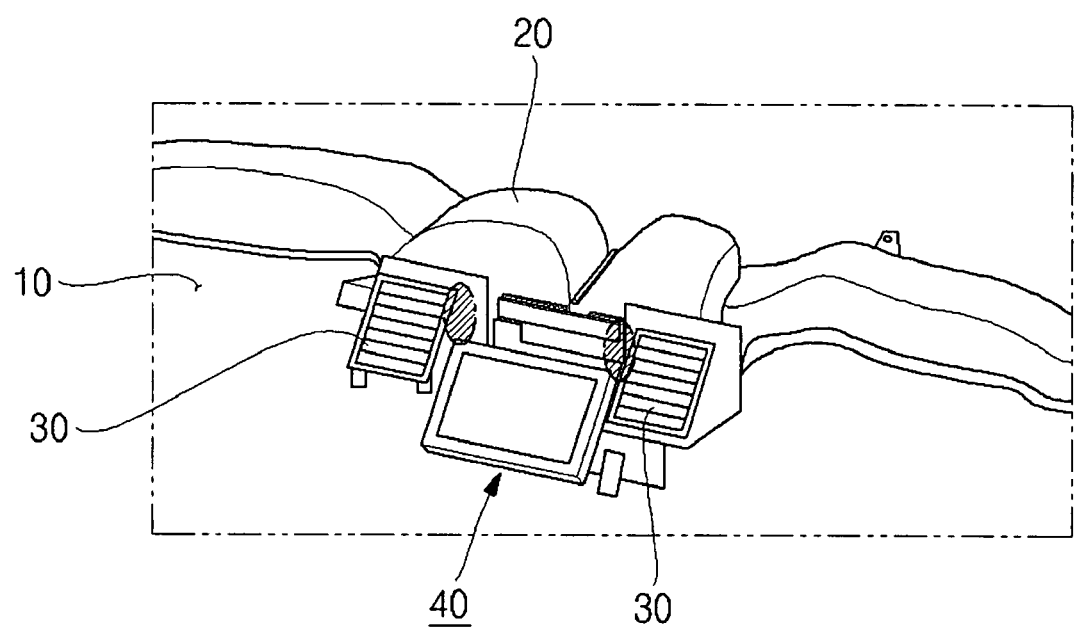

[FIG. 3]
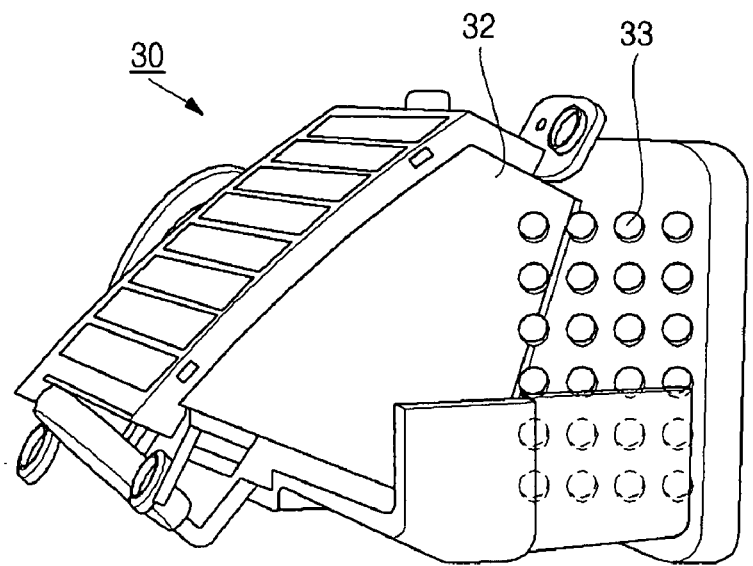
[FIG. 4]
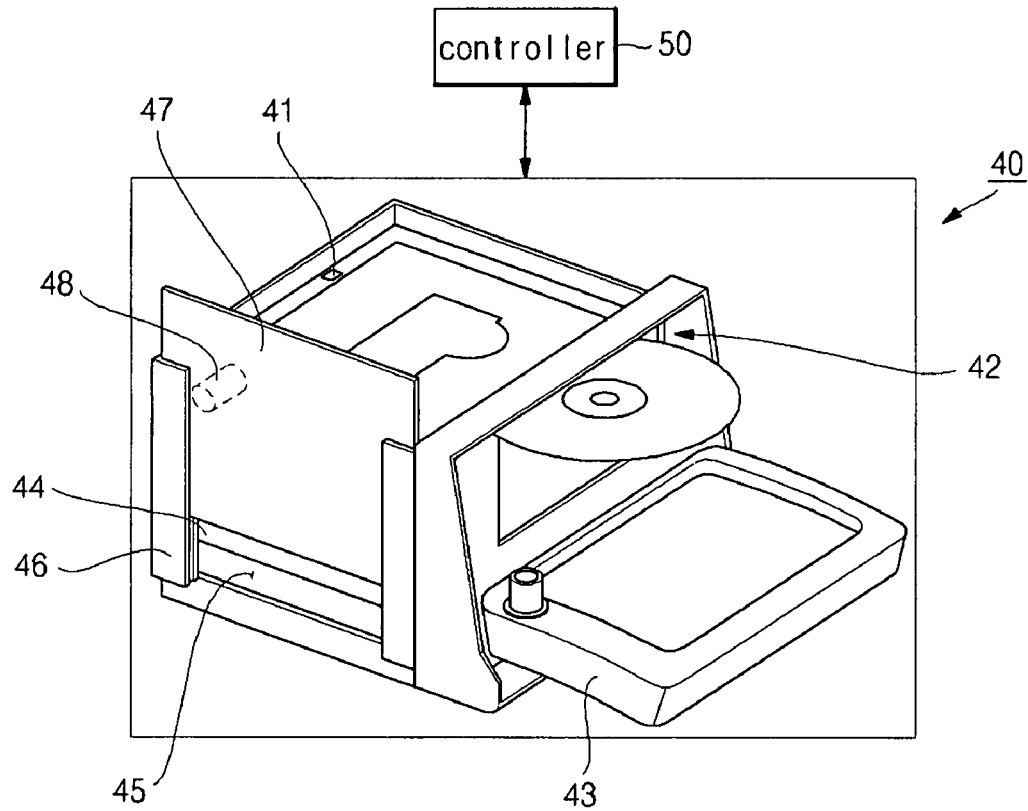

[FIG. 5]
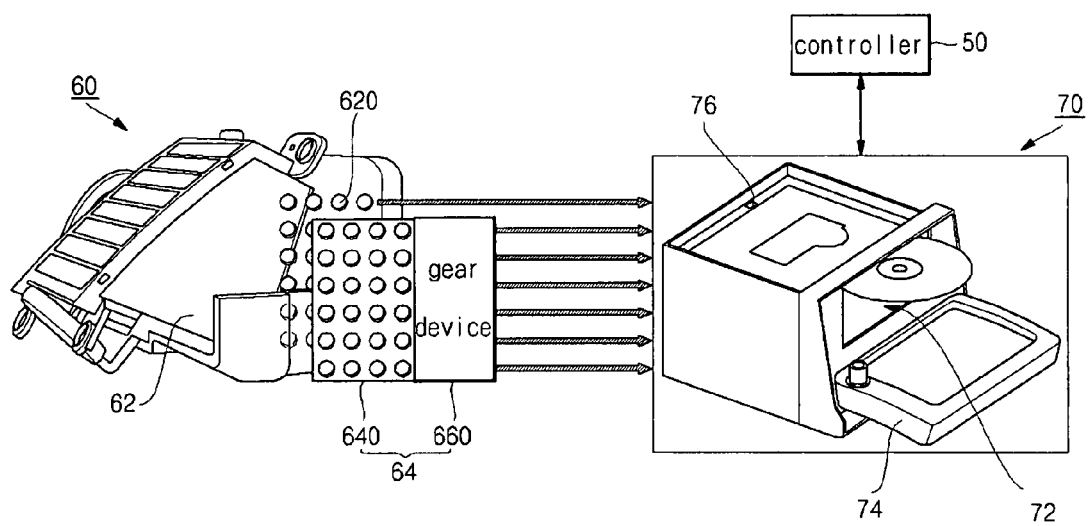
[FIG. 6]
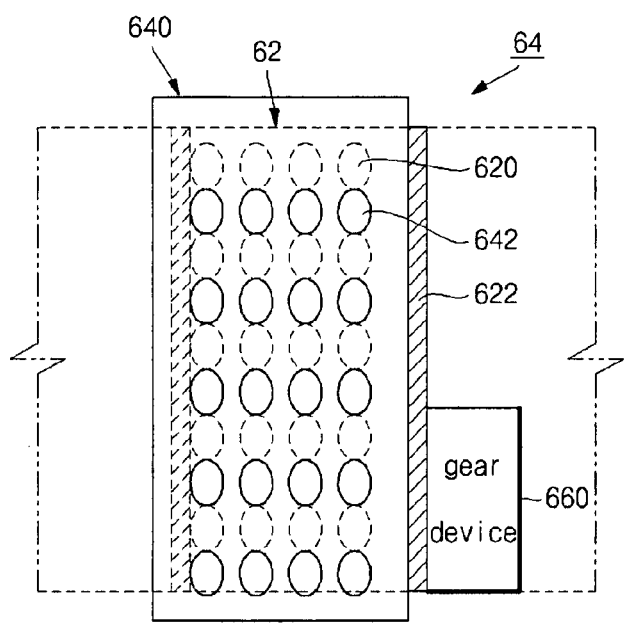

[FIG. 7]
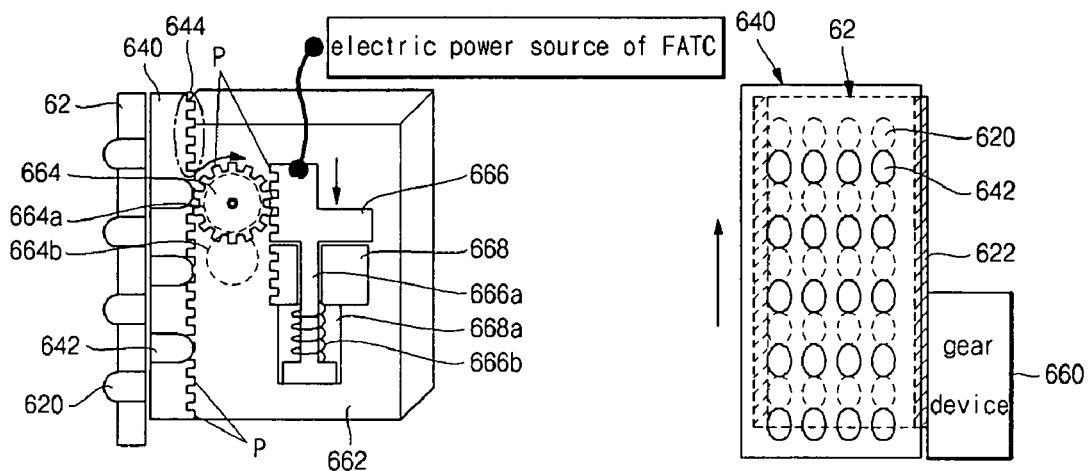
[FIG. 8]
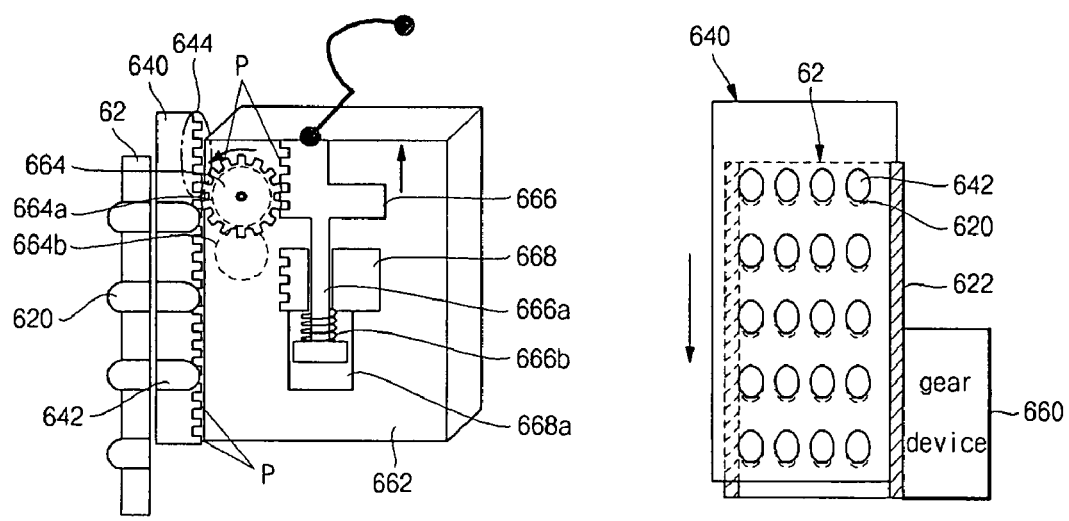

SYSTEM MAINTAINING TEMPERATURE OF DECK

CROSS-REFERENCE TO RELATED APPLICATION

This application claims, under 35 U.S.C. §109, priority to and the benefit of Korean Patent Application No. 10-2006-0126877 filed on Dec. 13, 2006, the entire contents of which are incorporated herein by reference.

BACKGROUND (a) Technical Field

The present invention relates to a system for maintaining the temperature of a vehicle audio and/or audio-video deck, and more particularly to a system for maintaining the temperature of a vehicle audio and/or audio-video deck, which can selectively supply cooled or heated air so as to maintain the temperature of the deck at a target temperature or range.

(b) Background Art

Vehicles have a deck for holding an audio unit for replaying a cassette tape or a CD or for a radio, an audio-video (AV) unit for broadcasting or a navigator, or the like.

The deck is composed of various parts. A great amount of heat can be accumulated in the deck, which causes the temperature of the deck to become high. Typically, if a cassette tape or a CD is replayed for a long time, the deck temperature may become seriously high.

To resolve this problem of temperature rise, some technologies have been proposed. One example of such technologies provides a system that stops the operation of the deck when its temperature becomes higher than a certain temperature. This system, however, has drawbacks in that the operation of the deck can be frequently stopped in summer, which causes inconvenience to passengers.

Another proposed system uses a cooling fan to reduce the temperature, as shown in FIG. 1. This system also has drawbacks in that although a deck 1 can be cooled by a cooling fan 3, overall cooling efficiency is not good for some reasons. First, the size of the cooling fan 3 is not large enough to achieve a desired cooling efficiency. Second, positioning the cooling fan 3 is limited. As a result, it is difficult to cool the entire deck 1 and it takes a long time to do so.

There is thus a need for a new system that can solve the above-described problems associated with prior art.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide systems for maintaining the temperature of a vehicle audio and/or AV deck, in which cooled or heated air can be selectively introduce to the deck so as to maintain the temperature of the deck at a target temperature or range.

A preferred embodiment of the present invention provides a system comprising: an air duct positioned on both sides of the deck for supplying cooled or heated air to the vehicle cabin, a side part of the air duct defining therein a plurality of through holes through which cooled or heated air can be supplied to the deck; a sensor disposed inside the deck for detecting the temperature inside the deck; a side panel provided in the deck, which defines therein a penetration part for introducing cooled or heated air supplied through the through holes into the deck; a guide rail formed to the side panel; a sliding panel guided by the guide rail so as to open or close the penetration part; a driving motor coupled to the deck for moving the sliding panel along the guild rail; and a controller coupled to the deck for driving the driving motor in response to the temperature detected by the sensor so as to open or close the sliding panel, thereby maintaining the temperature of the deck at a target temperature or range.

In this embodiment, the controller may be a full automatic temperature control device. Also, the controller may regulate the temperature of the deck in response to the manipulation of a switch by a user.

Another preferred embodiment of the present invention provides a system comprising: an air duct positioned on both sides of the deck for supplying cooled or heated air to the vehicle cabin: a sensor disposed inside the deck for detecting the temperature inside the deck; a side panel provided in the deck, which defines therein a plurality of communication holes for supplying cooled or heated air to the deck; a panel guide rail formed to the side panel; an opening/closing device including a gear device and a flow panel that defines therein a plurality of opening/closing holes the shape and position of which are corresponding to those of the communication holes, wherein the flow panel is moved by the gear device along the panel guide rail so as to open or close the communication holes; and a controller coupled to the deck for driving the opening/closing device in response to the temperature detected by the sensor so as to open or close the communication holes, thereby maintaining the temperature of the deck at a target temperature or range.

Likewise, in this embodiment, the controller may be a full automatic temperature control device. It also may regulate the temperature of the deck in response to the manipulation of a switch by a user.

Preferably, in this embodiment, the flow panel may further comprise a gear that has a plurality of gear teeth formed along an end part thereof in a length direction and is operatively connected to the gear device. In this case, the gear device may further comprise: a main body; at least one rotating gear inside the main body, the rotating gear having a plurality of gear teeth that can engage with the gear teeth of the flow panel so as to raise and lower the flow panel; an operating part inside the main body, the operating part having a plurality of gear teeth that can engage with the gear teeth of the rotating gear so as to rotate the rotating gear in a clockwise or counter-clockwise direction; a damping member provided to the operating part for dampening an operating impact; and a supporter which is disposed at a lower part of the operating part and is provided with a receiving part at an inside thereof to receive and support the operating part.

Suitably, the rotating gear may comprise: a main rotating gear having a plurality of gear teeth that can engage with the gear teeth of the operating part and the gear teeth of the flow panel; and a sub rotating gear having a plurality of gear teeth that can engage with the gear teeth of the main rotating gear at a lower part of the main rotating gear. In this case, preferably, the main rotating gear has a diameter greater than that of the sub rotating gear.

The above information disclosed in this Background section is only for enhancement of understanding of the background of the invention and therefore it may contain information that does not form the prior art that is already known in this country to a person of ordinary skill in the art.

BRIEF DESCRIPTION OF THE DRAWINGS

FIG. 1 is a perspective view of a conventional deck which is provided with a cooling fan.

FIG. 2 is a perspective view of an air duct and a deck according to a first exemplary embodiment of the present invention.

FIG. 3 is a perspective view of the air duct of FIG. 2.

FIG. 4 is a perspective view of the deck of FIG. 2.

FIG. 5 is a perspective view of an air duct and a deck according to a second exemplary embodiment of the present invention.

FIG. 6 is a schematic view of the communication hole opening/closing device shown in FIG. 5.

FIG. 7 is a drawing showing how the communication hole of FIG. 5 operates.

FIG. 8 is another drawing showing how the communication hole of FIG. 5 operates.

Reference numerals set forth in the Drawings includes reference to the following elements as further discussed below:

| 10:   | vehicle cabin          | 20:    | crash panel        |
|-------|------------------------|--------|--------------------|
| 60:   | air duct               | 620:   | communication hole |
| 64:   | opening/closing device | 640:   | flow panel         |
| 660:  | gear device            | 664:   | rotation gear      |
| 666:  | operating part         | 666a:  | piston             |
| 666b: | damping member         | 668:   | supporter          |
| 50:   | controller             | 70:    | deck               |
| 76:   | sensor                 |        |                    |

DETAILED DESCRIPTION

Exemplary embodiments of the present invention will hereinafter be described in detail with reference to the accompanying drawings. The same reference numeral will be used for the same elements throughout the specification.

Referring to FIG. 2 to FIG. 4, a system for maintaining the temperature of a vehicle audio and/or AV deck according to a first exemplary embodiment of the present invention will be explained.

As shown in FIG. 2, a vehicle cabin 10 is provided with a crash panel 20. A plurality of air ducts 30 is installed to the crash panel 20 for introducing air into the vehicle cabin 10. The introduced air can be heated or cooled by an air conditioner. A deck 40 is disposed between the air ducts 30.

As shown in FIG. 3, each of the air ducts 30 includes a plurality of through holes 33 formed in a side part 32 thereof, which are disposed to face the deck 40. Heated or cooled air is introduced to the air duct 30, and then to the neighboring deck 40 via the through holes 33.

As shown in FIG. 4, an audio unit 42 and an AV unit 43 are provided to the deck 40. Within the deck 40 is provided a sensor 41 for detecting the temperature inside the deck 40.

A side panel 44 is provided in the deck 40. At least one penetration part 45 is formed to the side panel 44 for introducing into the deck 40 heated or cooled air that has passed the through holes 33.

The penetration part 45 can be perforated in a length direction or, as shown in FIG. 4, in a width direction of the side panel 44. Preferably, the penetration part 45 is formed at a position corresponding to the position of the through holes 33.

A guide rail 46 is formed in the side panel 44. The guide rail 46 receives a sliding panel 47 and support it so as to be slidable.

An end part in a length direction of the sliding panel 47 is inserted into the guide rail 46. It can slidably move so as to be able to open or close the penetration part 45. The size and the shape of the sliding panel 47 may vary according to the size and the number of the penetration part 45.

A driving motor 48 operates the sliding panel 47 to open or close the penetration part 45. A controller 50 drives the driving motor 48 on the basis of temperature data detected by the sensor 41 so as to maintain the temperature of the deck 40 at a constant temperature.

Preferably, the controller 50 can be provided as a separate device. Also preferably, it can be realized by a full automatic temperature control (FATC) unit.

In case that it is necessary to cool an overheated deck 40, the controller 50 (or the FATC unit) operates an air conditioner to supply cooled air. The cooled air is supplied to the deck 40 via the through holes 33 and the penetration part 45. Meanwhile, the driving motor 48 moves the sliding panel 47, thereby opening the penetration part 45.

Similarly, in case that it is necessary to warm an overcooled the deck 40, the controller 50 (or the FATC unit) operates an air conditioner to supply heated air. The heated air is supplied to the deck 40 via the through holes 33 and the penetration part 45. Meanwhile, the driving motor 48 moves the sliding panel 47, thereby opening the penetration part 45.

These operations can be either automatically performed by the FATC unit or the controller 50 or manually performed by operation of a switch by a user. In case of manual operation, preferably, a separate switch is provided at an instrument panel or a deck. Also preferably, a switch may be added to the FATC unit.

Referring to FIG. 5 to FIG. 8, a system for maintaining the temperature of a vehicle audio and/or AV deck according to a second exemplary embodiment of the present invention will be explained.

A plurality of air ducts 60 for introducing heated or cooled air into the vehicle cabin 10 is installed to the crash panel 20 within the vehicle cabin 10, and a deck 70 is disposed between the air ducts 60 (see FIG. 2).

As shown in FIG. 5 and FIG. 6, each of the air ducts 60 includes a plurality of communication holes 620 which are formed in a side panel 62. In addition, a panel guide rail 622 for guiding a flow panel 640 to slidably move is formed in a length direction on an outside of the side panel 62.

The communication holes 620 have a shape of an ellipse. Cooled or heated air produced by an air conditioner is sent to the air duct 60 and then to the neighboring deck 70 via the communication holes 620.

Preferably, the communication holes 620 may be formed on the side panel 62. Also preferably, the communication holes 620 may be formed on a separate panel and the panel may be fixed to the side panel 62 by welding or the like. In this case, the side panel 62 includes a cut part in response to the separate panel. The communication holes 620 are opened or closed by an opening/closing device 64.

The opening/closing device 64 includes the flow panel 640 which opens or closes the communication holes 620. The device 64 also includes a gear device 660 which drives the flow panel 640.

The flow panel 640 is a separate panel corresponding to a part to which the communication holes 620 are formed. The panel 640 has a plurality of opening/closing holes 642 having a size and a shape corresponding to those of the communication holes 620. The panel 640 further includes a gear 644 which operates to be linked with the gear device 660.

The gear 644 includes a plurality of gear teeth P, and is formed at an end part in a length direction of the flow panel 640. The gear teeth P of the gear 644 are engaged with the gear teeth P formed to a rotating gear 664 of the gear device 660 so as to cause the flow panel 640 to move up and down along a length direction.

If the flow panel 640 moves up and down by the gear device 660, the opening/closing holes 642 are overlapped by or deviated from the communication holes 620 so that the communication holes 620 can be opened or closed.

The gear device 660 includes a main body 662 in a shape of a box, a rotating gear 664 rotatably disposed within the main body 662, an operating part 666 which drives the rotating gear 664, and a supporter 668 which supports the operating part 666.

As shown in FIGS. 7 and 8, a plurality of gear teeth P are formed on an outer surface of the rotating gear 664. The gear teeth P are engaged with the gear teeth P formed on the operating part 666 and the gear 644 of the flow panel 640 so as to rotate the rotating gear 664.

There is no specific limitation on the number of the rotating gear 664. Preferably, one rotating gear can be used. Also preferably, two rotating gears can be used. For example, the rotating gear 664 may include a main rotating gear 664a and a sub rotating gear 664b. The main rotating gear 664a may be engaged with the gear teeth P formed to the operating part 666 and the gear 644. The sub rotating gear 664b rotates by engagement with the main rotating gear 664a and is engaged with the supporter 668. In order to drive the flow panel 640, only the main rotating gear 664a should be engaged with the gear 644 and the sub rotating gear 664b should not contact the gear 644, so it is preferable that the diameter of the main rotating gear 664a is greater than the diameter of the sub rotating gear 664b.

The operating part 666 is provided with the gear tooth P engaging with the rotating gear 664, and moves along a length direction of the main body 662 so as to rotate the rotating gear 664. A lower end of the operating part 666 to which the gear teeth P is extended is provided with a piston 666a.

The piston 666a is received by the supporter 668, and an end thereof is formed to be wider than an inlet of a receiving part 668a formed to the supporter 668 so as not to be arbitrarily separated from the supporter 668. A damping member 666b is inserted into an end of the piston 666a.

The damping member 666b serves to reduce operation noise which is generated by collision of an end of the piston 666a with the supporter 668 during the operation of the operating part 666. The damping member 666b may be realized by any one of coil spring, hydraulic cylinder, pneumatic cylinder, and so forth. In case that the damping member 666b is realized by hydraulic cylinder or pneumatic cylinder, the damping member 666b may preferably be integrated with the piston 666a, and the supporter 668 may be omitted (only the coil spring is shown in the drawing for convenience).

The receiving part 668a is formed to the supporter 668 so as to receive the piston 666a. If two rotating gears 664 are used, gear teeth are formed on a side surface to support the sub rotating gear 664b.

The operating part 666 can be connected to an alternating current (A/C) electric power source of the FATC unit so as to obtain driving force.

FIG. 5 shows a system including an audio unit 72 and an AV unit 74 provided to the deck 70. A sensor 76 is provided inside the deck 70 for detecting the temperature inside the deck 70.

In response to the temperature inside the deck 70 is detected by the sensor 76, the controller 50 operates the opening/closing device 64 to open or close the communication holes 620 which are formed to the side panel 62. Accordingly, the temperature of the deck 70 may be maintained at a temperature or within a range to ensure normal operation of the deck 70.

In case of a vehicle which is provided with a FATC unit, the controller 50 can be realized by the FATC unit. In a vehicle without the FATC unit, the controller 50 is provided as a separate device to regulate the temperature of the deck 70.

These processes will be explained in more detailed hereinafter.

As shown in FIG. 7, if the deck 70 is overheated, communication holes 620 should become opened.

In order to open the communication hole 620, the controller 50 or FATC unit operates the opening/closing device 64. While the operating part 666 connected to the controller 50 moves down, the gear teeth P are engaged with one another so as to rotate the rotating gear 664 in the direction of the arrow shown in FIG. 7.

While the rotating gear 664 rotates in the direction of the arrow, the gear 644 engaged with the gear teeth P moves in the direction opposite to the rotation direction of the rotating gear 664, and the flow panel 640 moves up.

At this time, the piston 666a of the operating part 666 moves down to a bottom surface of the receiving part 668a of the supporter 668, and the damping member 666b is extended to slowly lower the piston 666a.

As such, if the flow panel 640 moves up so that the opening/closing holes 642 overlap the communication holes 620, the communication holes 620 become opened. The cooled air produced by an air conditioner is sent to the deck 70 via the communication holes 620 so that the deck 70 is cooled.

On the other hand, in case that the temperature of the deck 70 is too low, the communication holes 620 can be opened in the similar way, and heated air will be supplied to the deck 70.

As shown in FIG. 8, if the temperature of the deck 70 reaches a target temperature or range thereof, the communication holes 620 become closed and supplying of cooled or heated air will be stopped.

In order to close the communication holes 620, the controller 50 or FATC unit operates the opening/closing device 64.

While the operating part 666 connected to the controller 50 moves up, the gear teeth P are engaged with one another so as to rotate the rotating gear 664 in the direction of the arrow shown in FIG. 8.

While the rotating gear 664 rotates in the direction of the arrow, the gear 644 engaged with the gear teeth P moves in the direction opposite to the rotation direction of the rotating gear 664, and the flow panel 640 moves down.

At this time, the piston 666a of the operating part 666 moves up to the position of an inlet of the receiving part 668a of the supporter 668. While the damping member 666b is compressed, the piston 666a is prevented from colliding with the receiving part 668a.

As such, if the flow panel 640 moves down so that the opening/closing holes 642 are deviated from the communication holes 620, the communication holes 620 become closed. Accordingly, supply of cooled or heated air to the deck 70 through the communication hole 620 is cut off.

For this, the sizes and shapes of the opening/closing holes 642 and the communication holes 620 should be similar or identical. Preferably, the rotation distance of the rotating gear 664, the operation distance of the operating part 666, and the operation distance of the flow panel 640 are formed to be slightly greater than the length (longitudinal diameter) of the communication hole 620.

With these embodiments of the present invention as described above, the temperature of a vehicle audio and/or AV deck can be maintained at a target temperature or range that ensures normal operation of the deck, credibility of the product, and user convenience.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for maintaining the temperature of a vehicle audio and/or audio-video deck provided in a vehicle cabin, the system comprising:
    an air duct positioned on both sides of the deck for supplying cooled or heated air to the vehicle cabin:
    a sensor disposed inside the deck for detecting the temperature inside the deck;
    a side panel provided in the deck, which defines therein a plurality of communication holes for supplying cooled or heated air to the deck;
    a panel guide rail formed to the side panel;
    an opening/closing device including a gear device and a flow panel having a plurality of opening/closing holes formed thereon, each of the opening/closing holes having the shape and position corresponding to those of the communication holes, wherein the flow panel is moved by the gear device along the panel guide rail so as to open or close the communication holes; and
    a controller coupled to the deck for driving the opening/closing device in response to the temperature detected by the sensor so as to open or close the communication holes, thereby maintaining the temperature of the deck at a target temperature or range.

2. The system of claim 1, wherein the controller is a full automatic temperature control device.

3. The system of claim 1, wherein the controller regulates the temperature of the deck in response to the manipulation of a switch by a user.

4. The system of claim 1, wherein the flow panel further comprises a gear that has a plurality of gear teeth formed along an end part thereof in a length direction and is operatively connected to the gear device, and
    wherein the gear device further comprises:
    a main body;
    at least one rotating gear inside the main body, the rotating gear having a plurality of gear teeth that can engage with the gear teeth of the flow panel so as to raise and lower the flow panel;
    an operating part inside the main body, the operating part having a plurality of gear teeth that can engage with the gear teeth of the rotating gear so as to rotate the rotating gear in a clockwise or counter-clockwise direction;
    a damping member provided to the operating part for dampening an operating impact; and
    a supporter which is disposed at a lower part of the operating part and is provided with a receiving part at an inside thereof to receive and support the operating part.

5. The system of claim 4, wherein the rotating gear comprises:
    a main rotating gear having a plurality of gear teeth that can engage with the gear teeth of the operating part and the gear teeth of the flow panel; and
    a sub rotating gear having a plurality of gear teeth that can engage with the gear teeth of the main rotating gear at a lower part of the main rotating gear.

6. The system of claim 5, wherein the main rotating gear has a diameter greater than that of the sub rotating gear.

* * * * *